United States Patent [19]
Kuhlman

[11] 3,779,205
[45] Dec. 18, 1973

[54] FOOD APPLICATOR

[76] Inventor: Harvey G. Kuhlman, N56 W21466 Silver Spring Rd., Menomonee Falls, Wis.

[22] Filed: Jan. 6, 1972

[21] Appl. No.: 215,765

Related U.S. Application Data

[62] Division of Ser. No. 32,030, April 27, 1970, Pat. No. 3,682,106.

[52] U.S. Cl. ............... 118/24, 118/16, 118/310
[51] Int. Cl. ............................................. B05c 5/00
[58] Field of Search .............. 118/16, 20, 24, 308, 118/310, 311, 312; 99/450.1; 222/149 X; 198/127 X

[56] References Cited
UNITED STATES PATENTS

| | | | |
|---|---|---|---|
| 1,643,143 | 9/1927 | Wilcox | 118/308 X |
| 2,370,168 | 2/1945 | Irmscher | 118/308 X |
| 2,372,225 | 3/1945 | Rieke | 118/308 X |
| 2,614,885 | 10/1952 | Roell et al. | 222/149 X |
| 2,865,766 | 12/1958 | Christianson et al. | 118/16 |
| 2,883,172 | 4/1959 | Mitchell | 198/127 X |
| 3,368,501 | 2/1968 | Kuhlman | 118/16 X |

Primary Examiner—John P. McIntosh
Attorney—Andrus, Sceales, Starke & Sawall

[57] ABSTRACT

A conveyor for the bases includes a plurality of parallel longitudinally-spaced tined shafts which are simultaneously rotated to carry the pizza bases through the food-depositing stations. The tines on adjacent shafts are offset and overlapped to minimize the spacing therebetween. The open structure defined by the tined supports provides an open structure to permit removal and/or recovery of the excess food. The sauce applicator includes a pressurized sauce spray head located within an open bottom enclosure mounted above the tined conveyor and includes a fluid activated cleaning pin to prevent clogging of the nozzle. The meat applicator includes a transfer belt which is cooled and a rotating metering means to drop selected amounts of grated meat upon the bases.

3 Claims, 9 Drawing Figures

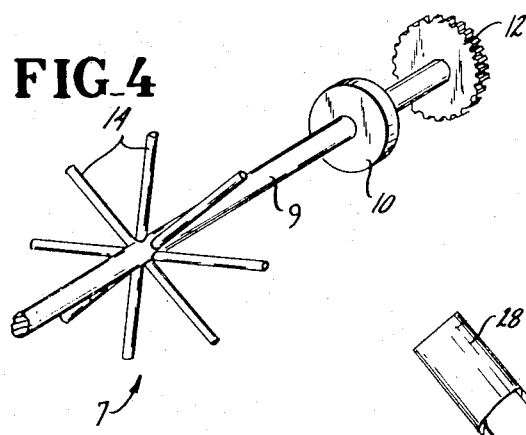
FIG_4
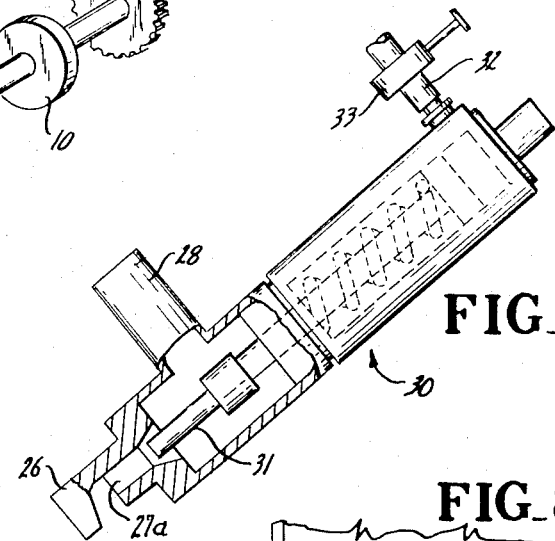
FIG_5
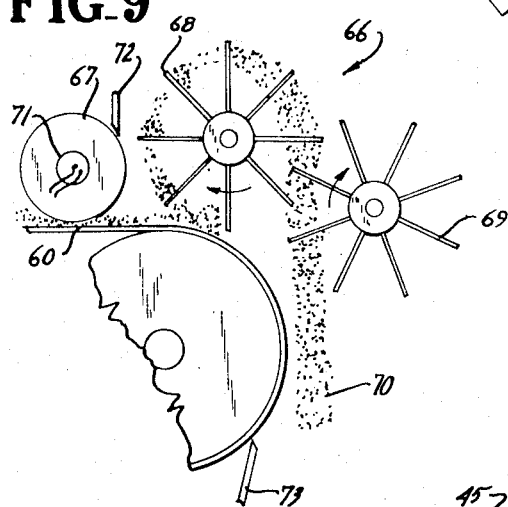
FIG_9
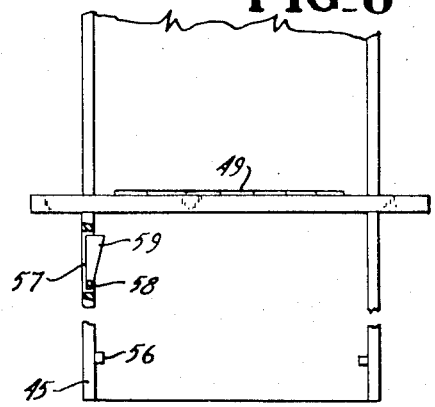
FIG_8
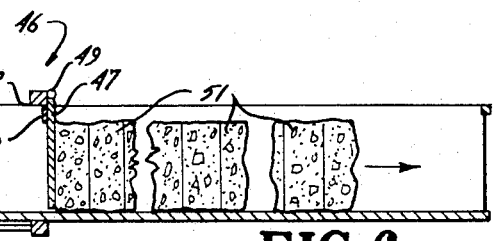
FIG_6
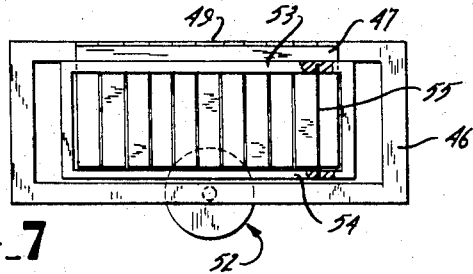
FIG_7

FOOD APPLICATOR

This is a division of application Ser. No. 32,030, filed Apr. 27, 1970 now U.S. Pat. No. 3,682,106.

BACKGROUND OF THE INVENTION

This invention relates to a food-depositing apparatus and particularly to an automatic means, and apparatus for applying or depositing ingredients upon a base member such as pizza material upon a pizza crust or base. The manual processing of pizza, particularly for frozen pizza which is sold through grocery stores and the like, is relatively time-consuming and expensive. Further, quality control is extremely difficult to obtain with the manual application and processing. A highly satisfactory, automatic pizza-forming apparatus is disclosed in U. S. Pat. No. 3,368,501 which was issued to Harvey G. Kuhlman on Feb. 13, 1968. As more fully disclosed in such patent, an automatic apparatus is provided for sequentially applying the various materials to a pizza base including automatic application of sauce, meat, shredded cheese and the like. The illustrated embodiment of that patent includes an open transfer apparatus in the form of laterally-spaced belts for transfer of the material through the sauce applicator and the shredded cheese applicator. The open structure is desirable in allowing excess material to drop through the transfer apparatus for recovery and the like.

SUMMARY OF PRESENT INVENTION

The present invention is particularly directed to an improvement in the food-distributing apparatus such as shown in U. S. Pat. No. 3,368,501 and, in particular, to an improved transfer means forming a part of the apparatus for supporting of the bases or the like while permitting excess material to drop through to a suitable recovery means. Generally, in accordance with the present invention, a plurality of spoked or tined supports define a transfer means for transferring of the pizza bases or the like through the food depositing units.

In the preferred construction, the several tined parts are formed of a suitable stainless steel or the like to permit ready cleaning thereof. A plurality of spaced shaft supports extend between a pair of longitudinal frame members. Each of the shafts is provided with a plurality of laterally spaced tine groups with each group similarly circumferentially distributed about the shaft. The tined groups on the respective adjacent shafts are offset and overlapped to minimize the spacing between the tined groups and thereby provide a convenient support for pizza bases and the like. The shafts are coupled to a suitable drive such as a common chain drive and continuously rotated in a corresponding direction to continuously move the transfer bases through the appropriate food-depositing units. In particular, the open structure defined by the tined supports is adapted to incorporation into the sauce applicator and/or the cheese applicator to provide the open structure immediately in the applicating area to permit removal and/or recovery of the excess food deposited upon the passing bases.

In a highly improved structure, the sauce applicator includes a pressurized sauce spray head located within an open bottom enclosure mounted above the tined transfer means. A sauce recovery means is disposed beneath the sauce applicating enclosure. The spray head is preferably provided with a fluid cleaning means to prevent clogging of the nozzle, such as an air-operated piston cleaner. The spray head deposits predetermined amounts of sauce across the transfer means for application in proper timed relation to the pizza bases. The excess sauce is recovered by the recovery means for recycling and reapplication to subsequent pizza bases. The tined transfer means extends from the sauce applicator to the infeed end of the shredded cheese applicator and forms a part thereof which may otherwise generally correspond to that of the Kuhlman patent. The meat applicator is preferably similar in structure to that disclosed of the cheese applicator construction shown in the Kuhlman U.S. Pat. No. 3,368,501 or the like, where the bases are to receive a predetermined quantity of distributed grated meat. In the meat applicator, means are provided to cool the grated meat and improve the mtering thereof.

The present invention has been found to provide a highly reliable means for transferring of the bases and depositing of highly accurately metered amounts of sauce, cheese or the like, while permitting convenient recovery of the excess material. The tined transfer structure, particularly when made of stainless steel or other readily cleaned material, permits convenient cleaning of the apparatus with a hose or the like.

BRIEF DESCRIPTION OF DRAWINGS

The drawings furnished herewith illustrate the best mode presently contemplated by the inventor for carrying out the subject invention in which the above advantages and features are clearly disclosed, as well as others which will be readily and fully understood from the following description of the illustrated embodiment.

In the drawings:

FIG. 4 is a pictorial view of one of the transfer elements shown in FIGS. 1 and 2;

FIG. 5 is an enlarged fragmentary view of the sauce applicator shown in FIGS. 1 and 2;

FIG. 6 is an enlarged sectional view of the cheese feeder shown in FIGS. 1 and 2;

FIG. 7 is a front elevational view of the cheese feeder shown in FIG. 6;

FIG. 8 is a plan view of the cheese feeder; and

FIG. 9 is an enlarged fragmentary view of the meat applicator shown in FIG. 1.

Figure 1:
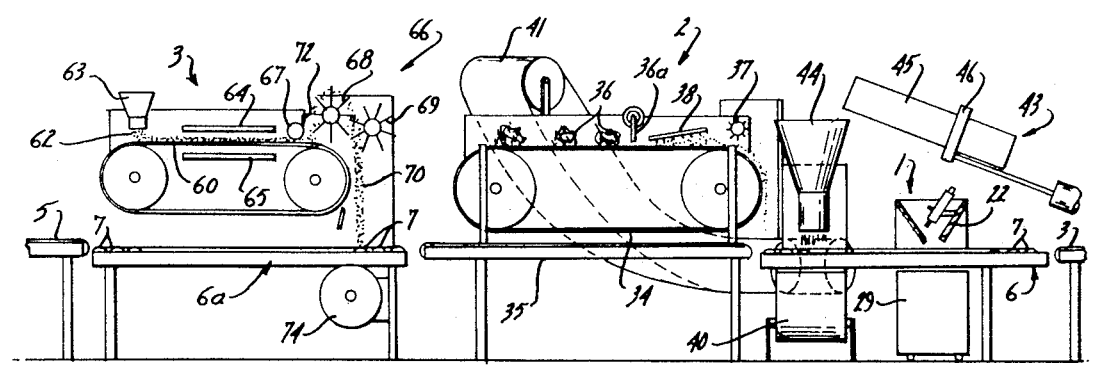
FIG. 1 is a side elevational view showing the overall construction of the improved pizza-forming apparatus incorporating the subject matter of the present invention.

Referring to the drawing and particularly to FIG. 1, the invention is illustrated in connection with a pizza-forming apparatus, including a sauce applicator 1 mounted to the infeed end of a cheese applicator 2, which is essentially constructed in accordance with the teaching of the Kuhlman U.S. Pat. No. 3,368,501, and a meat applicator 3 mounted to the outfeed end of applicator 2. An infeed pizza base belt 3a is mounted to the input side of the sauce applicator 1 and is adapted to transfer a plurality of pizza bases 4 as an aligned row into the sauce applicator. If desired, of course, single pizzas can be sequentially fed through the sauce applicator 1 and the cheese applicator 2. The advantage of providing the side-by-side construction, of course, is to substantially increase the production rate. The pizza bases 4 are passed through the applicators 1, 2 and 3 to receive metered amounts of sauce, cheese and meat, respectively, and removed through a suitable transfer belt 5 from the discharge end of the meat applicator 3. The infeed belt 3 and the discharge belt 5 are thus disposed to the opposite ends of the food applicating means of the apparatus and may be formed as generally flat, continuous surfaced belts to transfer the pizza bases 4 to and from the applicating units. The belts 3a and 5, as well as the other exposed elements of the apparatus, are preferably formed of a stainless steel or the like to permit convenient and ready cleaning thereof. The pizza bases 4 are transferred through the food applicating portions of the apparatus 5 by similarly constructed special conveyor or transfer means 6 and 6a aligned with the food depositing areas and particularly forms an important improvement in accordance with the present invention.

More particularly, the conveyor or transfer means 6 and 6a include a plurality of similar tined rotating supports 7 which are longitudinally spaced to define an improved open conveyance structure for carrying of the pizza bases 4 through the sauce applicator 1, the infeed end of cheese applicator 2 and the meat applicator 3, in the illustrated embodiment, for receiving of the respective food materials. The transfer means 6 extends through the sauce applicator 1 and the infeed end of the cheese applicator 2 while the similar transfer means 6a extends through the meat applicator 3.

Generally, in accordance with the illustrated embodiment of the present invention, the tined rotating supports 7 are journaled within spaced side frame members or units 8, suitably supported above ground level. Each of the rotating supports 7 is similarly constructed and includes a supporting shaft 9 secured at the opposite ends in suitable, rotating bearings 10 mounted respectively in the side frame units 8. The one end of the shaft 9 extends through the frame unit 8 and into a generally closed drive housing 11. A sprocket and chain drive unit 12 is coupled to each end of the shafts 9 within the housing 11 to provide for simultaneous and corresponding rotation of the shafts 9. The chain drive unit 12 may be coupled to a suitable drive pulley or the like, not shown, which, in turn, is coupled to and driven in synchronism with the main drive system for the belts 3a and 5. If desired, of course, any other suitable independent or separate drive can be provided for the rotation of the supports 7.

Figure 2:
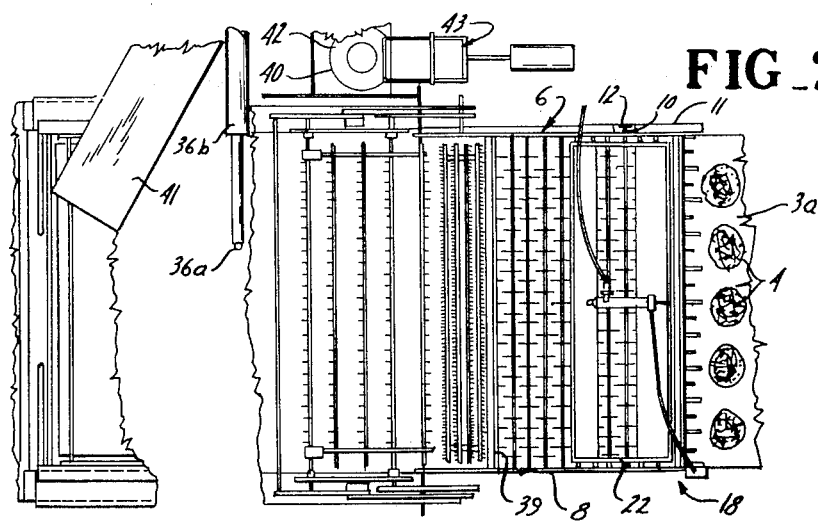
FIG. 2 is a fragmentary top plan view of a portion of FIG. 1.
Figure 3:
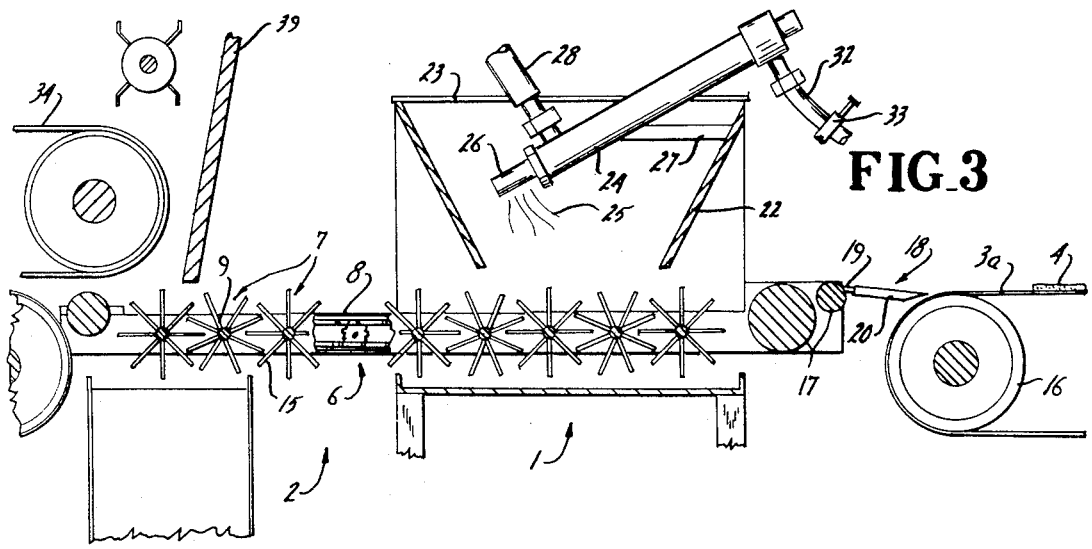
FIG. 3 is an enlarged, fragmentary, vertical section through a portion of the apparatus shown in FIG. 1 and, in particular, showing the improved transfer construction and the sauce applicator.

As most clearly shown in FIG. 4, each of the rotating supports 7 includes groups of tines or prongs 14 secured to the shaft 9 with each group including a plurality of individual tines or prongs equicircumferentially distributed about the shaft 9. Thus, in the illustrated embodiment of the invention, six equicircumferentially spaced tines 14 are secured to the shaft and define sequentially presented engaging ends to the pizza bases. The tine groups 14 in adjacent rotating support 7 are axially offset midway between adjacent groups of the adjacent support, as shown in FIG. 2. Further, the shafts are longitudinally spaced and the length of the tines 14 are such that the tines of adjacent supports 7 overlap, as shown in FIG. 3 at 15. This maintains an open structure while minimizing the space or openings between adjacent supports and providing an improved continuous support for the pizza bases 4. Thus, there is not a continuous groove-like depression formed in the supporting or transfer means 6 between the belts 3a and 5.

As shown in FIGS. 1 and 2, the infeed belt 3a is mounted on a pulley 16 adjacent the transfer means 6 and thus the supporting surface is spaced from the tine supports 7. The gap therebetween is shown closed by a coupling rollers 17 rotatably mounted within the side frames and coupled through to the chain drive unit 12 of the tine supports 7. A fixed pronged spacing unit 18 is secured between the frame members and includes a plurality of supporting pins 19 extending toward the infeed belt. Glass, plastic or similar smooth surface fingers 20 are secured to the pins and project forwardly with the underside of the fingers 20 tapered and extended into essentially sliding engagement with the belt 3. This provides a continuous rod-like support from the belt 3 to the coupling rollers 17 from which the pizza bases are transferred to the rotating tined supports 7.

The opposite end of the transfer end may be similarly constructed to transfer the pizza bases from the transfer means 6 to an intermediate discharge belt 21, forming a part of the cheese applicator 2 and carrying of the pizza bases 4 therethrough and depositing them upon the infeed end of the transfer means 6a for passage through the meat applicator 3.

In the illustrated embodiment of the invention, the sauce applicator includes an upper enclosure or hood 22 generally in the form of an open top and bottom tubular housing or enclosure which extends completely across the leading end portion of transfer means 6. A two-piece removable top cover 23 is provided to enclose the discharge end of a sauce applicating gun 24. The bottom of the hood 22 is completely open and allows transfer of sauce 25 from the nozzle 26 of gun 24 to the pizza bases as they move beneath the hood 22. In the illustrated embodiment of the invention, the gun 24 is secured by a suitable brace or support 27 to the front wall of the hood 22 to generally, centrally locate the gun 24. The gun extends through the two-piece top cover 23 with the lower end interconnected to a pressurized sauce source line 28. The gun 24 is mounted within the housing with the discharge nozzle 26 directed toward the open bottom. This directs the sauce downwardly onto the pizza bases 4 to insure an even application of the sauce onto the respective bases 4 as they pass beneath the bottom opening of the sauce hood or enclosure 22. A recovery unit shown as a pan 29 is mounted immediately below the transfer means 6 in alignment with the bottom opening of the enclosure 22 to recover any of the sauce material which falls through the transfer means 6. The pan 29 may be part of an automatic sauce recycling means, part of a wheel truck unit, or the like, for removal and return to the source.

The gun 24 is a suitable pressure operated unit wherein the sauce 25 is forced through a main feed opening 27a in the nozzle 26 under a selected pressure and is distributed downwardly and laterally across the transfer support to properly deposit a uniform layer of a preselected amount of sauce upon bases 4 as they move through the hood 22. In the illustrated embodiment of the invention, the gun 24 is generally an elongated cylindrical unit having the nozzle 26 at the lower end and the sauce hose 28 secured to the unit immediately adjacent the nozzle 26. As most clearly shown in FIG. 5, the gun 24 includes an air cylinder piston 30 secured to the outer end of sauce gun 24. The piston shaft extends through gun 24 and terminates in a cleaning pin 31 aligned with the sauce opening 27a. A fluid pressure source line 32 is connected to the unit 30. A control valve 33 selectively connects the line to a high pressure source, not shown, to force the piston assembly forwardly with pin 31 moving through opening 27a under a sufficient pressure to dislodge any hardened sauce. If the nozzle 26 should therefore become clogged by dried sauce or the like, the operator can readily clean and open the nozzle 26 by momentary application of pressure to line 32 to move the pin 31 through the opening 27a and positively discharge any clogging sauce.

Thus, as the pizza bases 4 move into the enclosure, the sauce 25 is applied. The sauce covered pizza bases 4 are then moved by the continuous tined transfer means 6 into the cheese applicator 2, which is generally constructed as shown in the Kuhlman U.S. Pat. No. 3,368,501 and which is only briefly described herein. In the illustrated embodiment, an endless cheese metering belt 34 is mounted longitudinally of and immediately above a transfer belt 35 extending between the trailing end of the transfer means 6 and the leading ends of transfer means 6a. The shredded cheese 36 is deposited as spaced mounds on the upper surface of the cheese metering belt 34. Where the cheese is deposited in a mound, as shown, a single distributing tine 36a may be mounted to move laterally across the belt and distribute the cheese. A pneumatic cylinder unit 36b is shown coupled to drive the tine 36a. A tined metering element or unit 37 is mounted immediately above the discharge end of the cheese metering belt 34 and a rake or smoothing means 38 is provided forwardly thereof to provide for continuous spreading and metering of selected amounts of cheese from the cheese belt onto the pizza bases 4 in accordance with the rotation of the belt 34 and the tined metering means 37. Thus, as the pizza bases 4 pass beneath the infeed end of the cheese belt 34, they are supported by the trailing end of the transfer means 6 which forms the input end of cheese applicator 2. The shredded cheese 36 is deposited on the sauce-covered bases 4 as they move beneath the input end of the belt 35 with any excess cheese freely passing downwardly through the tined transfer means 6 and onto a recovery means such as an accumulator pan, a transferring conveyor or the like.

In the illustrated embodiment of the invention, a vertical shield 39 is secured to the forward end of the cheese applicator 2. The shield 39 is a plate-like member which extends from immediately above the plane of the transfer means 6 and extends upwardly with the upper end suitably supported to the cheese applicator framework. The shield 39 prevents the shredded cheese from being thrown into the sauce unit 1.

In the illustrated embodiment of the invention, an improved cheese recovery and supply system is illustrated for use in connection with a gravity-depositing cheese applicator or the like. Generally, a stainless steel recovery belt 40 is mounted extending transversely of the cheese applicator and immediately beneath the cheese-depositing infeed end thereof in FIGS. 1 and 2. The recovery belt 40 is continuously revolved in synchronism with the operation of the cheese applicator through a separate or common drive system. The shredded cheese which falls downwardly between the tined supports 7 is carried by the recovery belt 40 laterally outwardly from the cheese applicator 2. The outer end of the recovery belt 40 overlies the lower end of a cheese supply conveying belt 41 which extends from beneath the recovery belt 40 upwardly and terminates in overlying relationship to the upper end of the main cheese applicator 2. This provides for automatic recovery and recycling of any excess cheese deposited and passed through the support. This same feed system is employed to supply shredded cheese from a special cheese shredding apparatus which includes a cheese supply unit 43 and a cheese grater 44 adapted to shred blocks of cheese and deposit them upom the transfer and recovery belt 40.

As most clearly shown in FIGS. 6 and 7, the cheese supply unit is generally a rectangular, open-top slide member 45 which extends downwardly from above the upper end of the cheese grater 44 to the floor level. The upper end of the slide 45 is open to permit transfer of cheese therefrom into the grater 44. An encircling support collar 46 is slidably mounted encircling the slide 45 as such. A plate 47 is hinged to the upper collar portion or bar 48 spanning the open top as by hinge 49 and depends downwardly therefrom into the slide 45 and spans the distance between the side walls. The hinge 49 is constructed for one-way movement which permits the plate to pivot upwardly in a counterclockwise direction from the normal depending position. A stop member 50 secured to the top bar is located behind the plate to prevent it from pivoting upwardly in a clockwise direction. Appropriate blocks of cheese 51 are deposited within the slide 45 with the collar 46 retracted, and with the plate 47 depending downwardly into the slide. A hydraulic piston unit 52 or the like is coupled to the bottom arm of the collar 46 and actuated to move upwardly, thereby moving the plate 48 into engagement with and forcing the cheese blocks 51 upwardly and through the upper end of the slide 45.

The upper end of the slide 45 is provided with an automatic cheese slicer shown including upper and lower support bars 53 and 54 secured to the top and bottom of the slide. A cutting wire 55 is threaded through the bars to define a plurality of laterally spaced cutting elements. Thus, as the block of cheese 51 is forced upwardly through the upper end of the cheese slide 45, the wire 55 defines an automatic cutting means which automatically cuts block 51 into a plurality of relatively small strips. The cut cheese is fed by gravity into the cheese grater 44 for reducing the cut cheese to the desired shredded cheese condition. The shredded cheese is passed to the recovery belt 40 and fed therefrom to the supply conveying belt 41 for transfer to the cheese applicator 2.

In the illustrated embodiment of the invention, the hinged plate 47 allows the loading of the slide 45 during the terminal portion of the feeding of the block 51 into the grater 44. Thus, with the collar and plate 47 moved upwardly toward the upper end of the slide 45, new blocks of cheese may be deposited in the lower end of the slide 45. As most clearly shown in FIG. 8, a stop wall or member 56 protrudes from the side walls of slide 45 to support the cheese blocks 51. The width of plate 47 is less than the width of the slide 45 to move freely past the members 56. When the collar 46 is retracted, the hinged plate 47 will pivot upwardly and pass over and past the cheese blocks, then pivots downwardly to pick up the next group of blocks 51. The stroke or movement of the plate 47 is approximately one half of the length of the slide 45. Spring loaded and pivotally mounted stop walls 57 are secured within openings 58 in the sidewalls of the slide 45 at the midpoint. The walls 57 have cammed or angled surfaces 59 projecting into the path of the upwardly moving blocks. The leading cheese block 51, therefore, pivots the stop wall 57 outwardly to allow free passage of the cheese blocks 51. The hinged plate 47 is slightly spaced from the sidewall and allows the stop wall 57 to pivot outwardly behind the cheese block 51 immediately adjacent the plate 47. In operation, the plate 47 is moved upwardly to locate the last cheese block 51 in front of the stop wall, retracted to pick up the next group of cheese blocks, and then moved upwardly to again force the previously located blocks 51 outwardly through the cutting wires 55. This has been found to provide a very simple, reliable and economical means for continuous feeding of the cheese into the applicator as required.

The shredded cheese is continuously applied to the pizza bases 4 in very accurately metered amounts and the covered bases are carried therefrom by the transfer means through the cheese applicator 2 and into the meat applicator 3. The meat applicator 3 may be constructed in any desired manner, such as shown in applicant's issued U.S. Pat. No. 3,368,501. In the illustrated embodiment of the invention, an alternative and novel meat applicator is shown for applying shredded or granulated meat which has been partially or wholly cooked. The meat applicator 3 includes an upper endless conveyor belt 60 overlying pizza base transfer conveyance 6a. The belt 60 is preferably a continuous stainless steel belt mounted on a pair of axially spaced pulleys 61. The meat is deposited thereon as a wholly or partially cooked ground or granulated meat 62 from a suitable pressurized meat source 63, such as a positive displacement pump feeding a hopper. The granulated meat extends laterally across the stainless steel belt 60 and is carried therefrom toward the infeed end of the meat applicator 3. The meat 62 is applied by gravity and a special metering unit from the forward end of the belt 60 onto the pizza bases 4 as they pass therebeneath.

In accordance with the illustrated construction, the meat 63 is provided at a relatively elevated temperature to permit convenient pumping or transfer of the meat 63 onto the conveyor belt 60. Suitable cooling means are provided to cool the meat 63 as it is transferred forwardly to the discharge end of the conveyor. Cooling plates 64 and 65 are shown above and below the belt to provide for cooling of the meat 63 as it passes therebetween. For example, the cooling plates 64 and 65 may be suitable sealed brine plates or apertured plates interconnected to a suitable source of cold air or other fluid with nozzles for directing the cold air to the opposite sides of the belt. In the latter, the bottom plate 65 would provide a continuous stream of cooling air to the underside of the belt 60, while the upper plate 64 would provide a continuous blanket of cooling air directed downwardly over the meat 63 carried thereby.

At the forward end of the meat applicator 3, a special feeding and metering unit 66 is mounted and includes a smooth surfaced roller or drum 67 which is rotatably mounted. Drum 67 rotates with the portion adjacent belt 60, moving in the same direction as belt 60 and establishes a selected leveling of the meat on the belt 60.

As most clearly shown in FIG. 9, the feeding and metering unit 66 further includes a pair of oppositely rotating and overlapping bladed or tined metering members or beaters 68 and 69. The metering beaters 68 and 69 are located immediately forwardly of the leveling drum 67 and with the overlapping portion slightly forwardly of the forwardmost end of the endless belt 60. The beater 68 adjacent the drum 67 is only slightly spaced from the belt 60 and rotates in the opposite direction. The beater 68 includes a plurality of closely-spaced blades or tines, similar to the cheese applicator or conveyor 6 and picks up the granulated meat 62 and carries it around into the other beater 69. The second beater 69 is located slightly lower than the first beater, and meshes with it. The tines of the beaters 68 and 69 are offset axially of each other, similar to the tined supports 7 and the second beater 69 rotates at a higher speed. In an actual unit, the second beater 69 rotated at twice the speed of the first. The granulated meat 62 is thus leveled by the drum 67 and removed by the first beater 68 and carried around and at least partially transferred to the second beater 69 to be deposited as a free-falling column 70 of granulated meat spaced slightly from the forward end of belt 60, as most clearly shown in FIG. 9. Applicant has found that this permits accurate metering of the granulated or ground meat.

The structure further is improved by heating of the leveling drum 67 to minimize the adhesion of the meat. In the drawing, a core electrical heater 71 is shown within drum 67. Further, a cleaning blade 72 is secured in sliding engagement with the surface of the drum 67 immediately above the first beater 68 to remove any meat adhering to the drum. Similarly, a cleaning blade 73 is shown secured in sliding engagement with the forward end portion of belt 60 to remove any meat adhering thereto.

The shredded meat thus falls on the bases 4 as they pass beneath the falling meat column. The meat that passes between the bases may be recovered in any suitable or desired manner. For example, an auger conveyor 74 may be mounted beneath the bed 6a to collect and convey the recovered meat from beneath the tined bed 6a for subsequent application. The auger-type conveyor may be employed for meat and, if desired, directly return the material to the meat supply 63 or belt 60.

In this manner, the pizza bases, after receiving the sauce and the cheese, are provided with an accurately controlled and predetermined amount of grated meat with the completed pizzas passing from the meat applicator and onto the discharge belt from which they may be passed directly to a suitable final processing and packaging unit, such as a water-film applicator, a blast freezer and the like.

The present invention thus provides a highly improved food-depositing apparatus particularly adapted for the formation of frozen pizzas and the like. The apparatus essentially eliminates the manual labor associated with the formation of pizzas and permits relatively high quantity production.

The present invention has particularly been found to provide a highly improved and reliable system for supporting and transferring of the pizza bases or the like through food depositing units 1 and 2 at a controlled, uniform speed while permitting convenient and economical cleaning of the apparatus.

Various modes of carrying out the invention are contemplated as being within the scope of the following claims which particularly point out and distinctly claim the subject matter which is regarded as the invention.

I claim:

1. A food applicator for applying a shredded meat to a base member passing therethrough, comprising a transfer means having an apertured conveying means and a shredded meat conveying means above said conveying means for carrying of shredded meat and depositing thereof onto said apertured conveying means, shredded meat supply means for transfer of meat to said meat conveying means at an elevated temperature, cooling means associated with said meat conveying means to cool the meat carried thereby and establishing a continuous granulated meat to the conveyor means, a leveling drum mounted above the shredded meat conveying means to level the shredded meat, a first bladed metering member rotatably mounted adjacent the shredded meat conveying means immediately forwardly of the leveling drum and in closely spaced relation to the shredded meat conveying means and the drum, said metering member rotating in the opposite direction as the movement of said conveying means to establish blades adjacent the conveying means which move opposite the movement of the conveying means and pick up the shredded meat, a second bladed metering member rotatably mounted forwardly of the first metering member and in mesh therewith, said second bladed metering member rotating in the same direction of said first metering member to pick up the shredded meat and establishing a falling column of granulated meat for covering the base members passing thereunder.

2. The food applicator of claim 1, having means to heat said drum.

3. The food applicator of claim 1, wherein said shredded meat conveying means is an endless belt, a first cleaning blade means mounted in sliding engagement with the drum to remove meat adhering to the drum, and a second cleaning blade means mounted in sliding engagement with said belt following said metering members to remove meat adhering to the belt.

* * * * *